T. & T. P. CHATWIN & J. VIRTUE.
DIE HEAD OF SCREWING MACHINES.
APPLICATION FILED MAR. 23, 1910.
996,311.
Patented June 27, 1911.
4 SHEETS—SHEET 1.
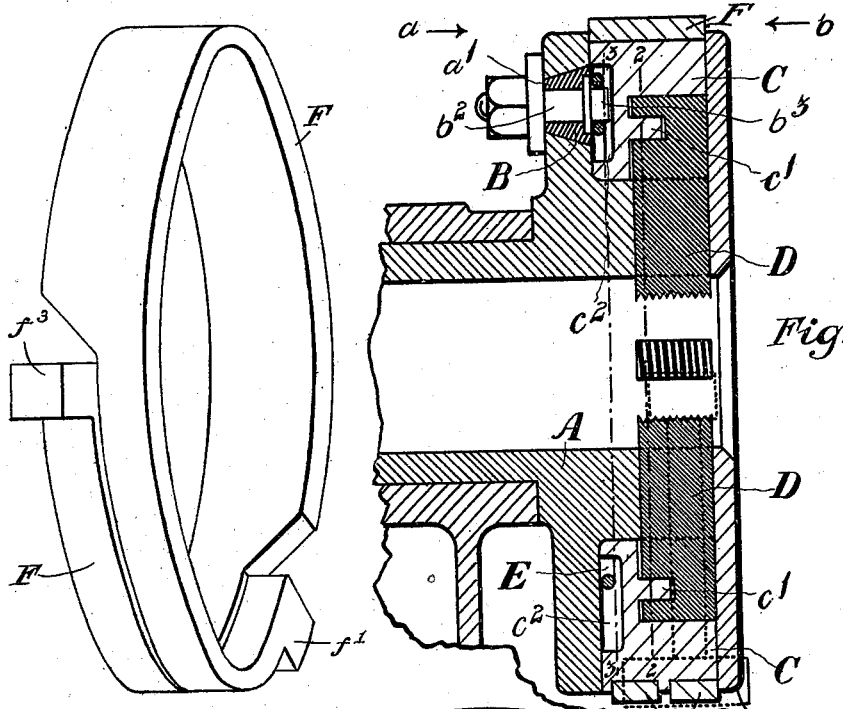
Fig. 1.
Fig. 9.
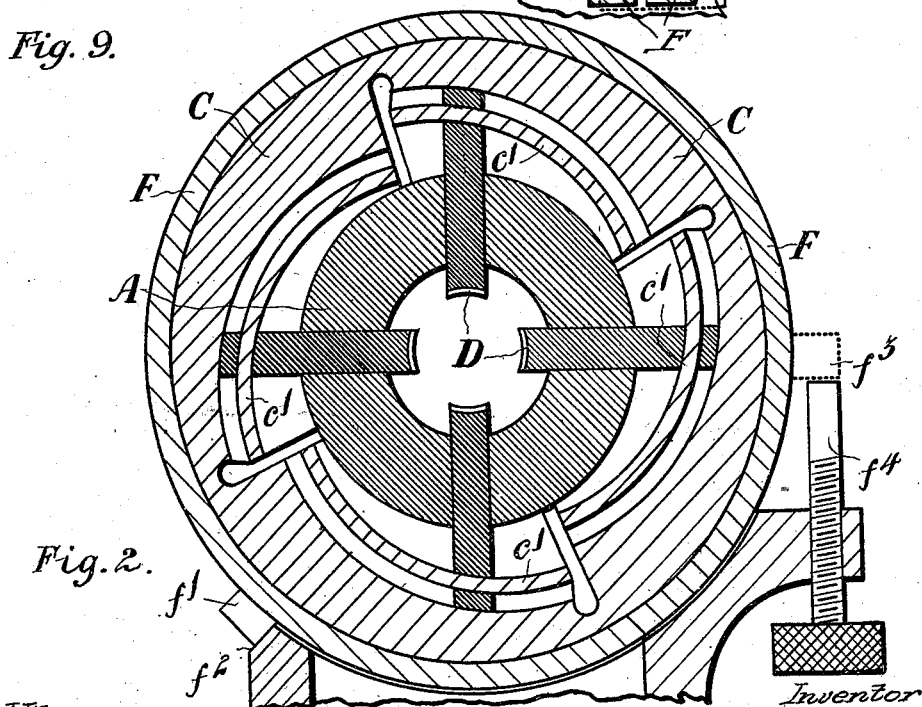
Fig. 2.
Witnesses
E. Schallinger
R. Svobstrid
Inventors
Thomas Chatwin
Thomas Philip Chatwin
James Virtue
by B. Singer Att'y

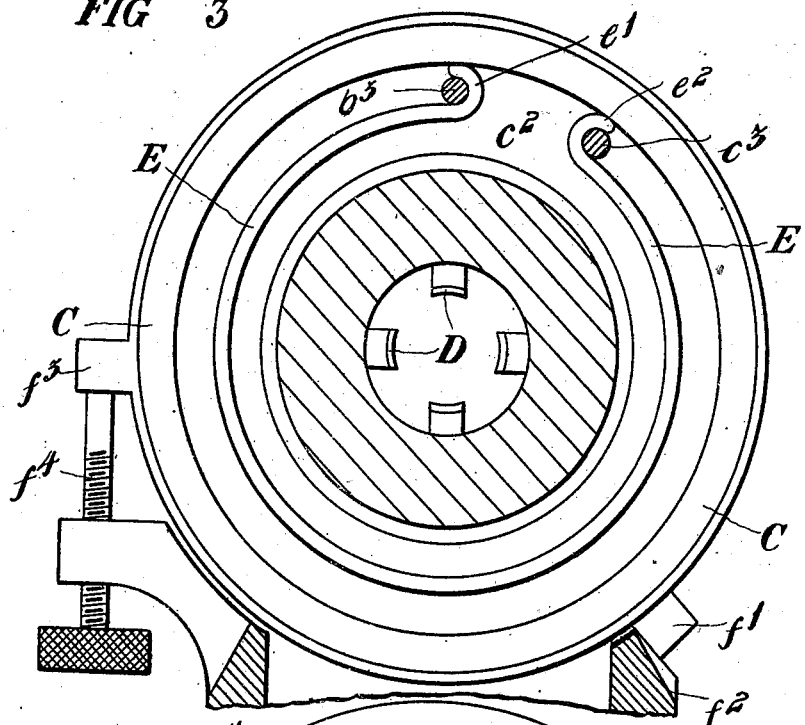
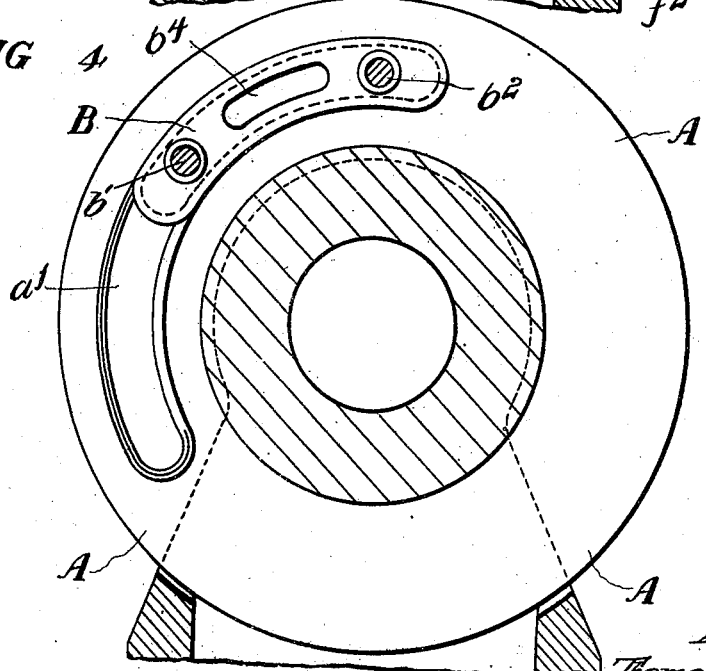

T. & T. P. CHATWIN & J. VIRTUE.
DIE HEAD OF SCREWING MACHINES.
APPLICATION FILED MAR. 23, 1910.
996,311.
Patented June 27, 1911.
4 SHEETS—SHEET 3.
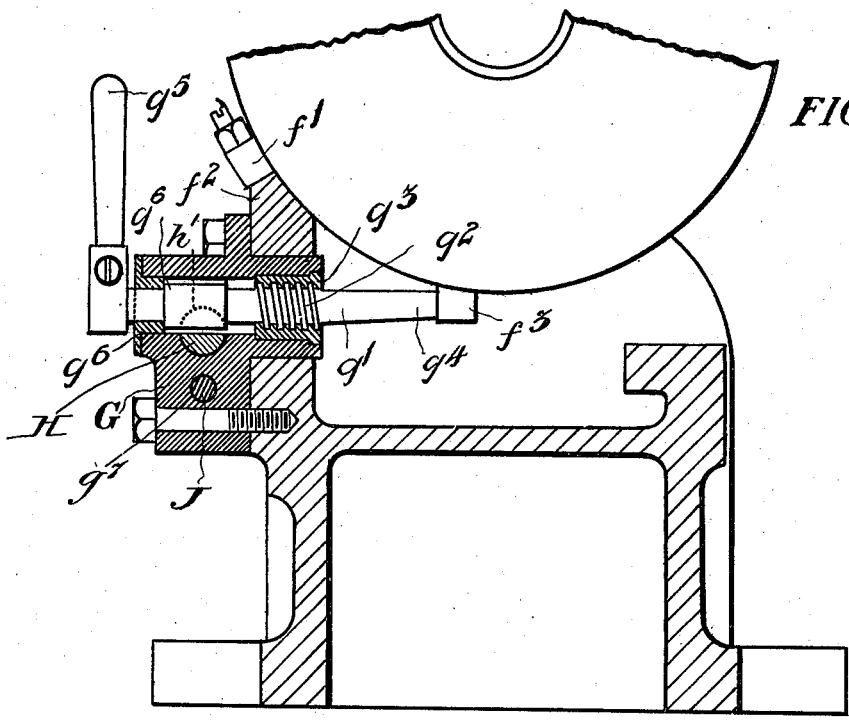
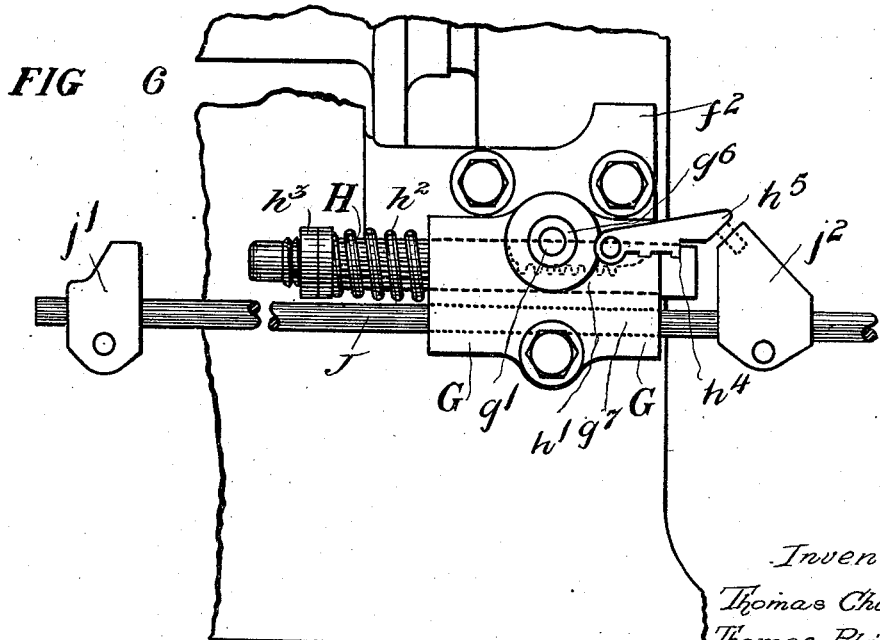
Witnesses
E. Schallinger
R. Goldstein
Inventors
Thomas Chatwin
Thomas Philip Chatwin
James Virtue
by B. Singer
Att'y T. & T. P. CHATWIN & J. VIRTUE.
DIE HEAD OF SCREWING MACHINES.
APPLICATION FILED MAR. 23, 1910.
996,311.
Patented June 27, 1911.
4 SHEETS—SHEET 4.
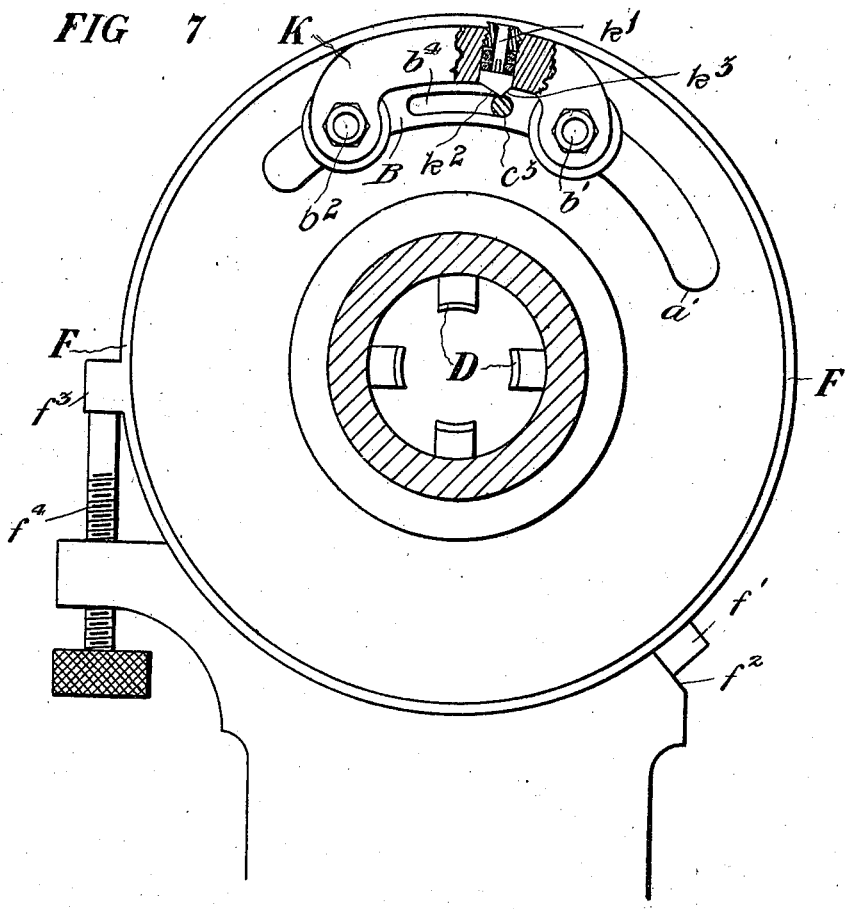
FIG 7
FIG 8
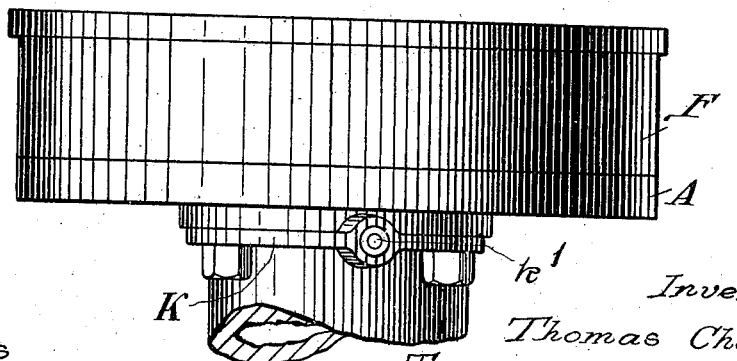
Witnesses
E. Schallinger
R. Goodstein
Inventors
Thomas Chatwin
Thomas Philip Chatwin
James Virtue
by B. Singer
Atty

UNITED STATES PATENT OFFICE.

THOMAS CHATWIN, THOMAS PHILIP CHATWIN, AND JAMES VIRTUE, OF BIRMINGHAM, ENGLAND.

DIE-HEAD OF SCREWING-MACHINES.

996,311.  Specification of Letters Patent.  Patented June 27, 1911.

Application filed March 23, 1910. Serial No. 551,154.

*To all whom it may concern:*

Be it known that we, THOMAS CHATWIN, engineers'-tool manufacturer, and THOMAS PHILIP CHATWIN, engineer, citizens of Great Britain, and residents of Great Tindal street, Birmingham, in the county of Warwick, England, and JAMES VIRTUE, citizen of Great Britain, and resident of 253 Maryvale road, Bournville, Birmingham, county of Warwick, England, draftsman, have invented certain new and useful Improvements in and Relating to Die-Heads of Screwing-Machines, of which the following is a specification.

This invention comprises improvements in and relating to die heads of screwing machines, and has for its object the provision of an improved device for releasing the dies in such heads without stopping the machine.

The invention consists in the application of a spring so mounted as to cause the cam controlling the dies to over-run the spindle and die head to a degree limited by adjustable devices to close the dies onto the work in conjunction with a brake for retarding the cam so that the spindle and die head can overtake it, thus causing the dies to run out off the work, when desired, without stopping the machine.

We are aware that a spring has been used for rotating a cam ring when a control device worked by contact with the work has been released for the purpose of opening dies of screwing machines and also that a brake has been used in conjunction with a spring but in this prior case the brake was applied to compress the spring and close the dies so that the cam ring could be locked in this position by a pawl. When the pawl was released the spring expanded to open the dies. In our invention we are particularly desirous of avoiding such use of spring for opening the dies as it is found in practice not to be dependable.

On the appended drawings:—Figure 1 is a central vertical section through a die head of a screwing machine with the invention applied. Fig. 2. is a transverse section on line 2—2 of Fig. 1. Fig. 3. is a transverse section taken on line 3—3 of Fig. 1 in direction of the arrow $a$. Fig. 4 is a similar section on line 3—3 but looking in the direction of arrow $b$. Fig. 5 is a sectional view showing a brake actuating device. Fig. 6. shows one method of automatically operating the actuating device. Fig. 7. is a view looking toward the back of the die head showing a catch that may be used. Fig. 8 is a plan thereof. Fig. 9 is a perspective view of a form of brake band used in the device of our invention.

These drawings show, a method of carrying the invention into practice as applied to a screwing machine having a die setting and releasing cam and chaser type dies. In this case we provide the back of the die head A with a coned or stepped slot $a^1$ concentric with the axis thereof and extending through about 120 to 140 degrees of the circle of the head, and we arrange a sliding block B in this slot provided with two locking pins $b^1$ $b^2$ so that the block may be set fast at any desired position in the slot. The adjusting and releasing cam C which is of the well known scroll form having four eccentric die engaging faces $c^1$ giving variations in the closing or opening of the dies D we provide with an annular recess $c^2$ in the side toward the back of the die head and into this recess projects a portion $b^3$ of the locking pin $b^2$ previously mentioned which portion projects beyond the head of the pin.

The sliding block B has within it a concentric slot $b^4$ or recess and the cam C is equipped with a pin or peg $c^3$ passing through the annular recess $c^2$ in the back into this slot $b^4$ in the sliding block of the die head see Fig. 4. A suitable spring E is arranged in the recess $c^2$ in the cam, one end $e^1$ engaging the projection $b^3$ on the locking pin $b^2$ and the other $e^2$ engaging the pin $c^3$ on the cam C so that a tension is set up between the cam and the adjustable block and as the latter is set fast to the die head the screwing spindle also. As the cam pin $c^3$ is free in the slot $b^4$ in the sliding block B this spring E keeps the pin $c^3$ in the end of the slot farthest removed from the locking pin $b^2$ to the projection $b^3$ of which the other end $e^1$ of the spring is connected. This position for the cam corresponds to the closed position for the dies, but it is obviously adjustable to suit requirements owing to the arrangement for the alteration of the position of the sliding block to allow for any adjustment of the dies within the capacity of the scrolls of the cam. It will thus be seen that, due to the slot $b^4$ in the sliding block B engaged by the cam pin $c^3$ the cam C is free to rotate quite independently of the die head A and in a contrary direction, for a distance equal to the length of the slot in the block, but this rotation opposes the tension of the spring E and immediately the force effecting it is removed, the cam rotates forward again to the original position with its pin at the end of the slot as above stated. This rotation of the cam C contrary to the die head and against the tendency of its spring is really simply relative movement between the two caused by retarding the cam and thus allowing the die head to overtake it. This is effected by a brake applied to the cam during its rotation with the die head and spindle, causing it to lose speed with respect to the latter so that the die head passes it and puts the spring E in greater tension. This relative partial back rotation of the cam in respect to the spindle runs the dies D back up the scrolls $c^1$ of the cam C and so off the work they are screwing. When the dies are required in screwing position again, the retarding influence or brake is removed from the cam C and its spring E forces it to overrun the spindle and die head A for the length of the slot $b^4$ of the sliding block B thus closing the dies D by the action of its scrolls $c^1$. As will be seen both these actions are carried out without stopping the machine.

The form of brake may be suited to circumstances but we here show a band brake F encircling the cam C and having lugs at each end; one $f^1$ rests on a fixed step $f^2$ and the other $f^3$ is operated by a screw pin $f^4$ to tighten the brake around the periphery of the cam C.

A further arrangement for applying the brake F is shown at Fig. 5, which is more readily accessible for operation and more rapid in its action than the previous arrangement. In this case a bearing G is secured to the bed and has a short rod $g^1$ working in it. The rod $g^1$ has a thread at $g^2$ passing through a fixed nut $g^3$ and at its extremity $g^4$ engages the lug $f^3$ of the brake around the cam. An offset $g^5$ forms a hand part for rotating the rod which by coaction of its thread $g^2$ with nut $g^3$, reciprocates in the bearing G and applies the desired force to lug $f^3$ of the brake. With this arrangement an automatic operation of the brake, and consequently of the dies, can readily be obtained. In such a case the rod $g^1$ carries a pinion $g^6$ and the bearing G is provided with a passage way for a rod H provided with a rack $h^1$, see Fig. 6. The rod H has a spring $h^2$ bearing against the bearing G and a collar $h^3$ at the other end has a notched portion $h^4$ engaged by a pivoted gravity or spring catch $h^5$. The rod J projects from the machine saddle and works through the guide $g^7$ in the bearing G carrying tappets $j^1$ and $j^2$.

As shown at Fig. 6 the tappet $j^2$ is just striking the end of catch $h^5$ to release the rod H which by action of its spring $h^2$ moves farther through bearing G, its rack $h^1$ driving pinion $g^6$ and advancing the rod $g^1$ to apply the brake and allow the cam to bring the dies into open position. On the reverse or return travel of the saddle the rod J returns and tappet $j^1$ engages the end of rod H and forces it backward again rotating pinion $g^6$ thus retreating rod $g^1$ and releasing brake. The rod H is driven against its spring by the tappet $j^1$ and is pushed through bearing G until the notched part $h^4$ is engaged by the catch $h^5$ thus retaining the spring in tension.

It will be seen that the tappet $j^1$ prevents the screwing machine saddle from being withdrawn more than a certain distance from the die head and dies, so that by putting the work to be screwed into the vice, so that it just comes flush with the front of the dies, any desired length of thread within the range of the mechanism may be screwed over and over again. Moreover the dies are re-set to size automatically without any movement on the part of the operator being necessary other than withdrawing the screwing machine saddle.

In this device the opening or releasing of the dies is entirely mechanical i. e. it is performed by the engine or motor or other power which is driving the machine, and is not done by a spring or springs. One spring only is used, and that is to turn the cam back to the set or closed position after the dies have been opened or released, so that this spring is only subject to the lightest of work.

The overhang of the die head from the main bearing of the machine is very greatly reduced by the before mentioned device, which is obviously a great advantage, as the bed of the screwing machine can be shortened accordingly, or if the length of the bed remains the same the extra space available allows the saddle or vice increased travel and so increases the capacity of the machine.

Left hand threads can be screwed by removing the right hand cam and substituting one of the opposite hand, which operation can be carried out in a few minutes. No other alteration or addition to the machine is necessary except of course the left hand screwing dies.

In this device the opening or releasing of the dies is really instantaneous, no time being lost through the operation of special releasing cams or trip gears.

It may be desirable to provide a catch over the cam pin $c^3$ to avoid any possibility of the dies running back when the machine is at work on heavy screwing. Such a catch is shown at Figs. 7 and 8 in which a bracket K is provided with a boss in which a spring plunger $k^1$ is arranged. The plunger is provided with inclined faces $k^2$ $k^3$ for engaging in a shaped notch in the cam pin. When the dies are closed and screwing the plunger engages the pin and holds it in the end of the slot remote from the fixed peg $b^2$. When the brake is applied to the cam and the die head overtakes it the plunger is carried over the pin so that the dies may open.

What we claim and desire to secure by Letters Patent is:—

1. A die head construction for screw machines comprising in combination, a rotary die head provided with an adjustable stop device having a slot therein, dies radially movable in said head toward and away from the work, a cam element provided with scroll cam portions for operating said dies and having a pin projecting into said device slot, a spring connected with said cam element and device for shifting the dies to a working position, and a brake device acting on the cam element to cause sufficient differential movement between the cam and head so as to retract the dies from the work.

2. A die head construction for screw machines comprising in combination, a rotary die head, dies radially movable thereon toward and away from the work, a cam element provided with scroll cam portions for shifting said dies, a spring connected with said cam and head to normally advance the dies toward the work, a device adjustably mounted on the head for connection of one end of the spring thereto, means anchoring said device in adjusted position, and a brake device acting on the cam to cause sufficient relative movement between the cam and head to retract the dies from the work.

3. A die head construction for screw machines comprising in combination, a rotary die head, dies radially movable toward and away from the work, an element provided with means for shifting the dies, a spring connected with said element and head to normally advance the dies toward the work, said head having a segmental slot therein, a block in said slot forming a connection for one end of said spring to said head, means for anchoring said block in said slot, and a brake device acting on said element to cause sufficient relative movement between the element and head to retract the dies from the work.

4. A die head construction for screw machines comprising in combination, a rotary die head, dies radially movable therein toward and away from the work, a cam element provided with scroll cam portions for shifting said dies, a spring connecting said cam and head to normally cause the dies to advance toward the work, a catch device for retaining the parts in such working position, and a brake device acting on the cam to cause sufficient relative movement between the cam and head to retract the dies from the work.

5. A die head construction for screw machines comprising in combination, a rotary die head, dies radially movable toward and away from the work, a cam element provided with scroll cam portions for shifting said dies, a spring connecting said cam and head to normally cause the dies to advance toward the work, a releasable catch for holding the parts in such working position, and a brake device for causing sufficient relative movement between the cam and head to retract the dies from the work.

6. A die head construction for screw machines comprising in combination, a rotary die head provided with a slotted portion, an adjustable stop device in such slotted portion and provided with a slot therein, dies radially movable in said head toward and away from the work, a cam element provided with scroll cam portions for shifting said dies and having a pin projecting into the slot in said stop device, a spring connected with the pin of said cam element and said stop device for shifting the dies toward a working position, and a brake mechanism for causing sufficient relative movement of the cam element and head to retract the dies from the work.

7. A die head construction comprising in combination, a rotary die head provided with an adjustable stop and spring holding device, dies radially movable on said head, a cam-like element connected with said dies for shifting the same and provided with a projection engaging said stop device, a spring connected with said stop device and said cam element to normally cause the dies to advance toward the work, and braking means for causing sufficient relative movement between the head and cam element to retract the dies from the work.

In testimony whereof we affix our signatures in presence of two witnesses.

THOMAS CHATWIN.
THOMAS PHILIP CHATWIN.
JAMES VIRTUE.

Witnesses:
F. GILBERT BRETTELL,
J. BEAUMONT PERCIVAL.

---

Copies of this patent may be obtained for five cents each, by addressing the "Commissioner of Patents, Washington, D. C."